United States Patent [19]

Travis

[11] 4,101,137

[45] Jul. 18, 1978

[54] PRESSURE SEAL AND METHOD FOR PRODUCING SAME

[75] Inventor: Robert R. Travis, Waukegan, Ill.

[73] Assignee: Outboard Marine Corporation, Waukegan, Ill.

[21] Appl. No.: 726,996

[22] Filed: Sep. 27, 1976

[51] Int. Cl.[2] .............................................. F16J 15/14
[52] U.S. Cl. ....................................... 277/1; 277/213; 277/235 B
[58] Field of Search ........... 277/235 B, 207 A, 207 R, 277/213, 1; 285/328; 123/41.82 R, 41.82 A

[56] References Cited

U.S. PATENT DOCUMENTS

| 2,211,045 | 8/1940 | Balfe | 277/235 B |
| 3,116,198 | 12/1963 | Grawey et al. | 277/1 |
| 3,794,333 | 2/1974 | Czernik et al. | 277/235 B |

FOREIGN PATENT DOCUMENTS

| 508,050 | 6/1939 | United Kingdom | 277/235 B |

Primary Examiner—Richard E. Aegerter
Assistant Examiner—L. Footland
Attorney, Agent, or Firm—Michael, Best & Friedrich

[57] ABSTRACT

Disclosed herein is a method for forming a pressure seal between the flat mating surfaces of two structural members including the steps of texturing one of the mating surfaces by providing a plurality of intersecting grooves thereon so as to form a continuous grooved recess through the region where the pressure seal is desired, applying an extrudable sealant on one of the mating surfaces along a path generally corresponding to the desired path of the pressure seal, and clamping the two structural members together to extrude the sealant into the grooves, whereby the continuous grooved recess is filled with the sealant to provide a pressure seal between the mating surfaces and face-to-face contact is established between the ungrooved portions of the mating surfaces.

5 Claims, 5 Drawing Figures

U.S. Patent
July 18, 1978
4,101,137
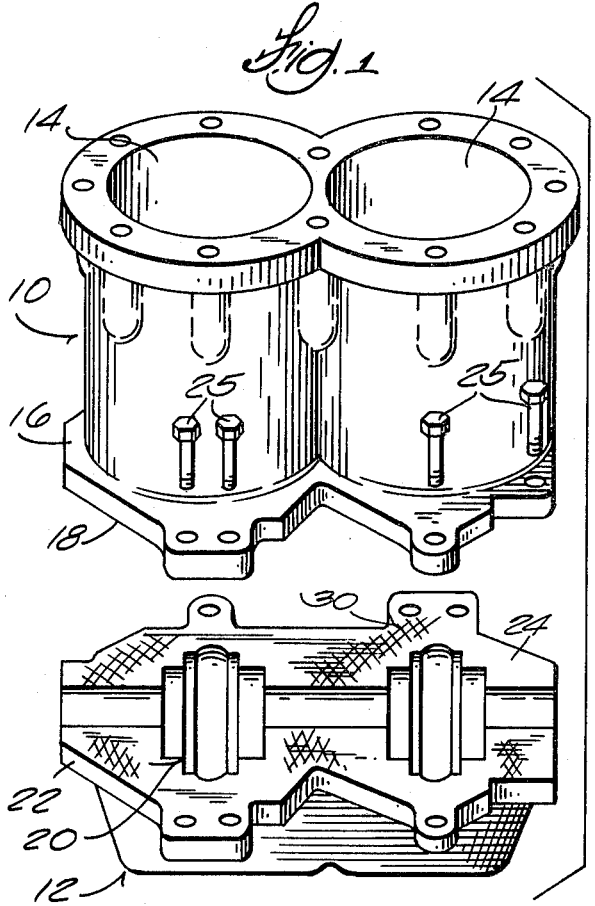
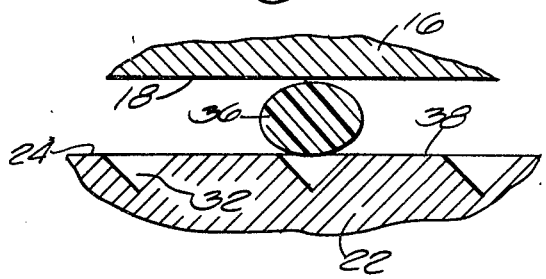
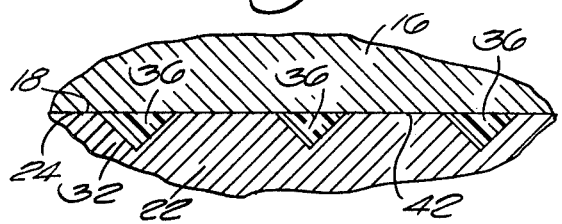
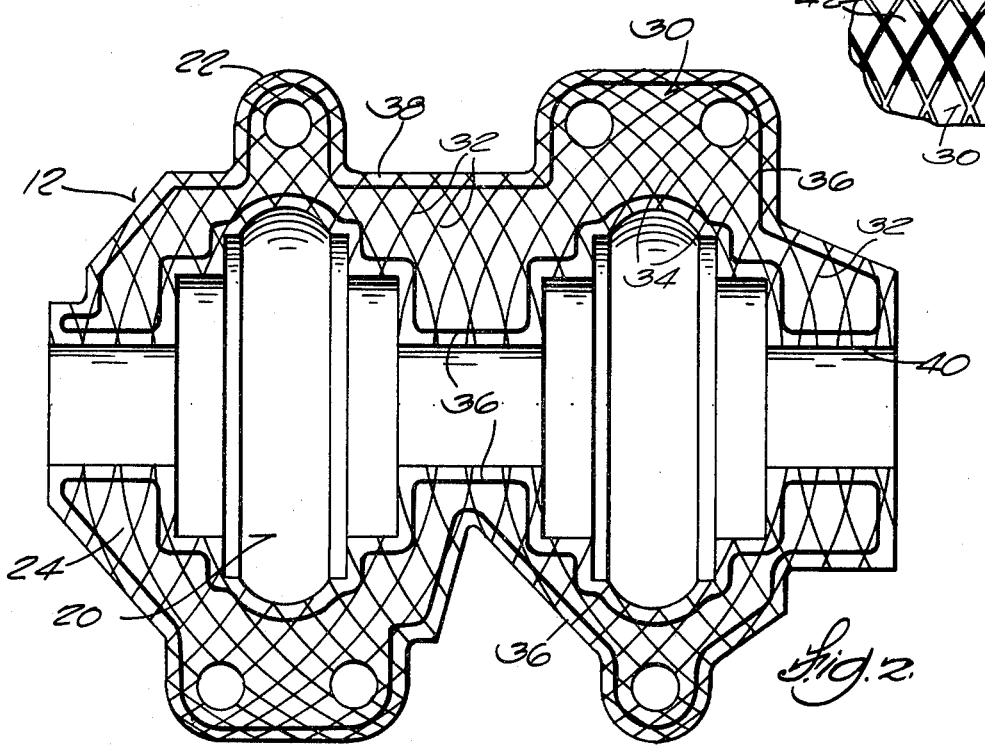

PRESSURE SEAL AND METHOD FOR PRODUCING SAME

BACKGROUND OF THE INVENTION

The invention relates to pressure seals between two structural members and a method for producing same.

Some machinery includes joints between components which require both a high pressure seal between the mating surfaces of the components and also a metal-to-metal contact between the mating surfaces. An example for such requirements is the joint between the cylinder block member and the crankcase member of a two-cycle internal combustion engine. These two members have machined recesses which, upon assembly of the members, cooperate to define crankshaft bearing bores. Any spacing between the mating surfaces can cause the bearing bores to be out of tolerance. It is generally undesirable to use a gasket as the pressure seal between the cylinder block member and the crankcase member because of the resultant dimensional effect on the bearing bores.

The most common approach for providing the pressure seal between these components has been to use an elastomeric sealing member which is compessed into a groove provided in one of the mating surfaces. While such a sealing arrangement generally is satisfactory, leakage can occur when there is crankcase flexure. The use of a layer of a sealant, such as a silicone rubber material, between the mating surfaces causes the same dimensional problems as the gasket. If the sealant layer is made very thin so as to minimize the effect on dimensional tolerances, relatively small crankcase flexures can cause tearing of the sealant and a resultant leakage.

Attention is directed to the following U.S. Pat. Nos.:
Snyder — 1,348,667 issued Aug. 3, 1920
Gillette — 2,062,305 issued Dec. 1, 1936
Grawey et al — 3,116,198 issued Dec. 31, 1963
Miklau et al — 3,586,338 issued June 22, 1971

SUMMARY OF THE INVENTION

The invention provides a method for forming a pressure seal between two structural members having substantially flat mating surfaces comprising the steps of texturing at least one of the mating surfaces by providing a plurality of intersecting grooves thereon in the general region where the pressure seal is desired, the grooves intersecting in a manner to provide at least one continuous grooved recess through the region where the pressure seal is desired, applying an extrudable sealant on one of the mating surfaces in the general region where the seal is desired, the amount of the sealant being sufficient to fill at least the continuous grooved recess, moving the structural members together with the mating surfaces in facing relation, and clamping the structural members together in a manner to apply sufficient compression between the mating surfaces to extrudate substantially all of the sealant into the grooves whereby face-to-face contact is established between the mating surfaces and the continuous grooved recess is filled with the sealant to provide a pressure seal between the mating surfaces.

In one embodiment, the grooves are arranged in a first series of spaced rows and a second series of spaced rows which intersect the rows of the first series to form a cross hatch groove pattern. The grooves preferably are V-shaped and the sealant preferably is a silicone rubber composition.

In one embodiment, the sealant is applied as a substantially continuous bead on one of the mating surfaces along a path generally corresponding to the desired path for the seal.

The invention also provides an assemblage comprising two adjoining structural members, each having substantially flat mating surfaces forming a joint therebetween, a plurality of intersecting grooves on at least one of the mating surfaces in a region where a pressure seal is desired, the grooves intersecting in a manner to provide at least one continuous grooved recess through the seal region, an extrudable sealant disposed between the mating surfaces, and means for clamping said structural members together to establish face-to-face contact between the mating surfaces and to extrude the sealant into the grooves and fill the continuous grooved recess so as to form a pressure seal between the mating surfaces.

One of the principal features of the invention is the provision of a simple method for forming a pressure seal between the mating surfaces of two structural members which pressure seal permits face-to-face contact between the mating surfaces.

Another of the principal features of the invention is the provision of such a method which permits the use of a sealant composition.

Still another of the principal features of the invention is the provision of a pressure seal between the mating surfaces of two structural members, which seal permits face-to-face contact between the mating surfaces and is capable of accommodating some flexure between the members without leakage.

Other features and advantages of the embodiments of the invention will become apparent upon reviewing the following detailed description, the drawing and the appended claims.

BRIEF DESCRIPTION OF THE DRAWINGS

FIG. 1 is an exploded view of a cylinder block member and a crankcase member for an internal combustion engine embodying various of the features of the invention.

FIG. 2 is a top plan view of the crankcase member in FIG. 1.

FIG. 3 is an enlarged, fragmentary view of the mating faces of the cylinder block member and the crankcase member of FIG. 1 shown prior to assembly and after the sealant has been applied.

FIG. 4 is an enlarged, fragmentary, sectioned elevational view of the mating surfaces after aassembly.

FIG. 5 is an enlarged, fragmentary top plan view of the mating surface of the crankcase member shown with assembly block member removed to illustrate the extrusion of the sealant into the grooves.

Before explaining at least one embodiment of the invention in detail, it is to be understood that the invention is not limited in its application to the details of construction and the arrangements of the components set forth in the following description or illustrated in the drawing. The invention is capable of other embodiments and of being practiced and carried out in various ways. Also, it is to be understood that the phraseology and terminology employed herein is for the purposes of description and should not be regarded as limiting.

DESCRIPTION OF THE PREFERRED EMBODIMENTS

Illustrated in the drawing is a cylinder block member 10 and a crankcase member 12 for a two cylinder, internal combustion engine. In FIG. 1, these members are shown in a position ready for assembly. Various engine components such as the pistons, the crankshaft, connecting rods, crankshaft bearings, etc. have been omitted to simplify the illustration.

The cylinder block member 10 includes a pair of cylindrical openings 14 which, in part, define the engine cylinders and a peripheral mounting flange 16 having a substantially flat surface 18. The crankcase member 12 includes a cavity, designated generally by reference numeral 20, and a peripheral mounting flange 22 having a substantially flat surface 24 which mates with the surface 18 of the cylinder block member 10 when the two mounting flanges 18 and 22 are clamped together by mounting bolts 25 during assembly.

When the engine block member 10 and the crankcase member 12 are assembled, portions of the crankcase member cavity 20 cooperates with corresponding portions (not shown) of the cylinder block member 10 in the usual manner to define bores for receiving the engine crankshaft bearings (not shown). In order to insure the proper dimensions for the bearing bores after assembly of the cylinder head member 10 and the crankcase member 12, there should be metal-to-metal or face-to-face contact between the mating surfaces 18 and 24.

During engine operation, the pressure inside the crankcase cavity 20 varies between superatmospheric and subatmospheric in response to reciprocation of the engine pistons. Also, there normally is some flexure of the crankcase 20 because of the oscillatory movement imposed thereon by the reciprocating engine pistons. In order to prevent leakage from and/or into the crankcase cavity 20 through the joint between the mating surfaces 18 and 24, a pressure seal is provided, which seal is capable of maintaining a positive seal between the mating surfaces when subjected to normal crankcase flexures, and yet does not prevent metal-to-metal contact between the mating surfaces.

This is accomplished by texturing in one of the mating surfaces 18 and 24 to provide a plurality of intersecting recesses or grooves and using an extrudable sealant which is extruded or squeezed into the grooves during assembly of the cylinder block member 10 and the crankcase member 12. More specifically, a plurality of intersecting grooves 30 (shown diagrammatically in FIGS. 1 and 2) are provided in the mating surface 24 of the crankcase member flange 22 in the region where the pressure seal is desired. The grooves 30 are arranged in the manner to provide a continuous grooved recess along a path where the pressure seal is desired. While various groove arrangements can be used, in the specific construction illustrated, the grooves 30 are arranged in first spaced rows 32 and second spaced rows 34 which intersect the first rows 32 to form a cross hatch groove pattern (FIG. 2). As shown in FIGS. 3 and 4 the grooves 30 preferably are V-shaped.

A quantity of an extrudable sealant, such as a silicone rubber sealant, is applied on one of the mating surfaces 18 and 24 along a path where the pressure seal is desired. As used herein, the term "extrudable sealant" means a conventional sealant composition having a relatively heavy, paste-like consistency permitting it to be applied on one of the mating surfaces without substantial spreading and having viscosity and lubricity characteristics permitting it to be substantially completely extruded or squeezed from between the mating surfaces and into the grooves by the normal compression applied on the mounting flanges 16 and 22 during assembly of the cylinder block member 10 and the crankcase member 12.

The sealant 36 preferably is applied as a substantially continuous bead generally adjacent the periphery of one of the mating surfaces. If only one of the mating surfaces 18 and 24 is textured, the sealant 36 preferably is applied on the textured mating surface, e.g., on the mating surface 24 as illustrated in FIG. 2. To insure a more positive seal, a bead of the sealant 36 preferably is applied adjacent both the outer periphery 38 and the inner periphery 40 of the textured mating surface 24 as shown in FIG. 2. The amount of sealant applied is sufficient to fill at least one continuous grooved recess along the general path of the desired seal. As a guide, when a cross hatch groove pattern similar to that shown in FIG. 2 is used, when the rows 32 and 34 are approximately 0.120 inch apart, when the grooves 30 are V-shaped, and when the grooves 30 are approximately 0.014 inch deep and 0.020 inch wide, a bead of silicone rubber sealant approximately 0.05 inch in diameter can be applied either on the mating surface 24 as shown, or on the mating surface 18, along the path where a pressure seal is desired.

After the bead of sealant 36 has been applied, the cylinder head member 10 and the crankcase member 12 are moved together and the mounting flanges 16 and 22 clamped together by tightening mounting bolts 25 in the usual manner. As the mating surfaces 18 and 24 are compressed together, the sealant 36 is extruded into the grooves 30 adjacent the bead and fills at least one continuous grooved recess along the desired path for the seal. Any excess sealant is extruded into other grooves 30 adjacent the path of the seal as shown in FIG. 5 which illustrates an exemplary form of the seal after the bead of sealant 36 has been squeezed or extruded into the grooves 30. (In FIG. 5, the cylinder head member flange 16 is shown removed for the purpose of illustration).

This extrusion of the excess sealant into the grooves 30 permits the mating surface 18 of the cylinder head member flange 16 to be moved into direct metal-to-metal or face-to-face contact with the ungrooved portions of 42 of the mating surface 24 of the crankcase member flange 22 as best shown in FIG. 4. In other words, the grooves 30 effectively minimizes the entrapment of any sealant between the mating surfaces 18 and 24. The resultant seal has a thickness generally corresponding to the depth of the grooves 30. Many elastomeric type sealants, such as silicone rubber sealants, having an effective thickness of about 0.010 to about 0.015 inch are capable of being stretched or elongated to the extent of normal flexure between the flanges 16 and 22 without tearing, thereby insuring a positive pressure seal.

Various of the features of the invention are set forth in the following claims:

What is claimed is:

1. A method for forming a pressure seal between two metallic structural members comprising the steps of forming flat surfaces on each of the two members, texturing at least one of the flat surfaces by providing a plurality of interconnecting grooves thereon in the general region where the pressure seal is desired, the grooves interconnecting in a manner to provide at least one continuous grooved recess through the region where the pressure seal is desired, applying an extrudable sealant on one of the flat surfaces in the general region where the seal is desired, the amount of the sealant being sufficient to fill at least the continuous grooved recess, moving the structural members together with the flat surfaces in facing relation, and clamping the structural members together in a manner to apply sufficient compression between the flat surfaces to establish face-to-face contact between the flat surfaces and to extrude substantially all of the sealant into the grooves, so as to fill the continuous grooves recess with the sealant to provide a pressure seal between the flat surfaces.

2. A method according to claim 1 wherein said grooves are arranged in a first series of spaced rows and a second series of spaced rows which intersect the rows of the first series to form a cross hatch groove pattern.

3. A method according to claim 1 wherein said sealant is a silicone rubber composition.

4. A method according to claim 1 wherein said sealant is applied as a substantially continuous bead on one of the flat surfaces along a path generally corresponding to the desired path for the seal.

5. A method according to claim 1 wherein said grooves are V-shaped.

* * * * *